United States Patent Office 3,025,992
Patented Mar. 20, 1962

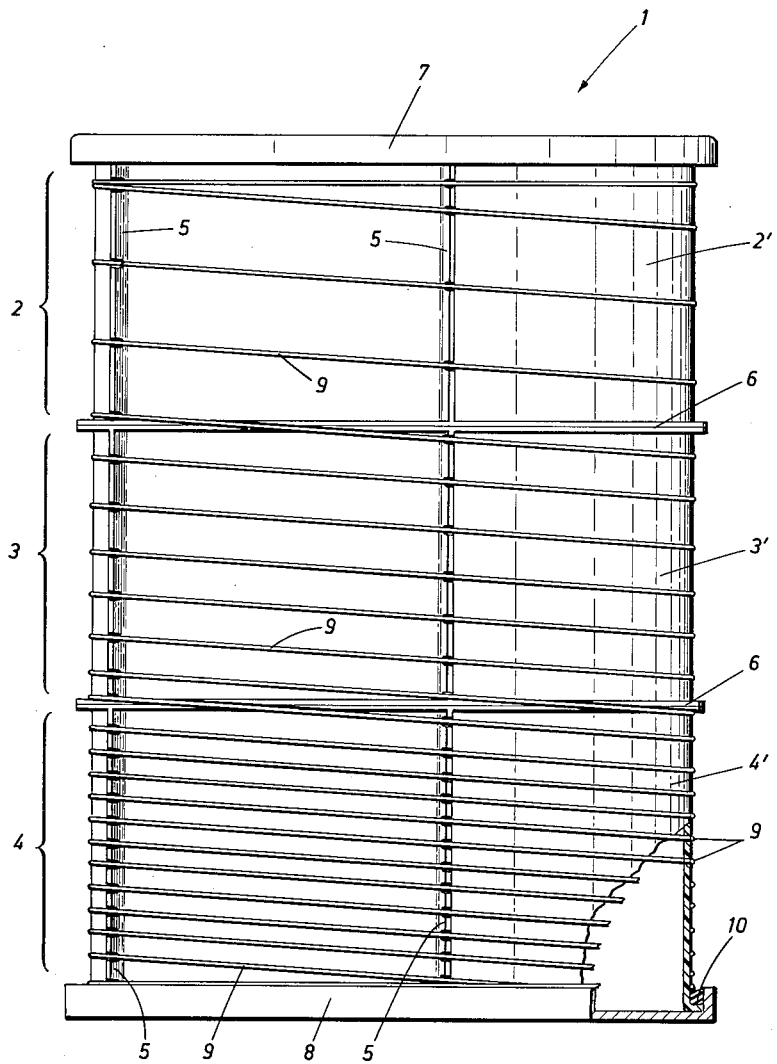

3,025,992
REINFORCED PLASTIC STORAGE TANKS
AND METHOD OF MAKING SAME
Frederick H. Humphrey, Markham, Ontario, Canada
Filed July 24, 1959, Ser. No. 829,199
2 Claims. (Cl. 220—5)

This invention relates to storage tanks and more particularly to reinforced plastic storage tanks.

Plastics have been used in the manufacture and installation of storage tanks only to a very limited scale and only for the smaller sizes. While plastic has excellent resistance to a wide range of chemicals, good impact strength, and a light weight which makes it most desirable for many applications, there appears at the present to be insufficient data available to designers on the effect of heavy loads over long periods of time. Designers have thus been concerned about the creep effect of such loads on plastic structures giving rise to a distinct possibility of eventual failure.

Furthermore, it is known that when reinforced polyesters and epoxy resins are placed in contact with liquids over a prolonged period of time there is a gradual reduction in tensile strength. To what degree this takes place is, at present, unknown.

To compensate for these unknown factors, a very high factor of safety is used in the design of plastic tanks and such tanks have, so far as I am aware, been limited to the smaller sizes.

It is an object of this invention to provide a plastic storage tank which, through the provision of a novel reinforcing means, will permit design and fabrication without uncertainty and/or the exaggerating safety factors heretofore deemed necessary.

It is another important object of this invention to provide a method of fabricating large storage tanks of reinforced plastic.

These and other advantageous objects will become apparent through a consideration of the following detailed specification taken in conjunction with the drawing which is a front view, partially broken away of one embodiment of a tank constructed in accordance with my invention.

My invention consists broadly in a plastic storage tank having reinforcing means consisting of a plurality of encircling bands of a high tensile strength material about the outer periphery of the tank and, in the preferred embodiment, having a continuous helically wound length of cable encircling the outer periphery of the tank and assuming the hoop stresses in the manner hereinafter described in detail.

In order to permit the construction of large plastic storage tanks, encircling cables or other high tensile strength bands are employed in my invention to carry the hoop stresses. The plastic is used only to contain the liquid.

According to an important concept of this invention, the reinforcing cable must be of substantially less elasticity than the plastic material used in the construction of the tank itself. Commonly used plastics have a modulus of elasticity of 1,000,000 p.s.i. Stainless steel has a modulus of elasticity of 29,000,000 p.s.i. Thus if steel cable is wrapped tightly around the outer periphery of a tank in a helical manner and fastened to the tank walls to support it thereon, when the load of the liquid contained in the tank is applied to the side walls of the plastic tank, an expansion of the tank walls will occur, thus transferring all of the hoop stresses to the surrounding cable. The plastic is therefore under only the very lightest load.

Since there have been many years of experience in the use of cables for the carrying of heavy loads over long periods of time, it thus becomes possible to select a cable having regard to the load required to be borne, the size and physical properties of the cable and the number of turns required.

According to the method of my invention the tanks may be fabricated from a leakproof fibrous glass reinforced polyester, epoxy, phenolic or other synthetic plastic shell. When here and elsewhere in the specification and claims I use the term "plastic," it is to be understood as meaning this group and others exhibiting the same physical and chemical characteristics capable of containing liquids.

The invention consists in reinforcing this plastic shell by wrapping a plurality of encircling bands of a high tensile strength material about the outer periphery of the shell. This high tensile strength material must, for reasons already stated, have less elasticity than that of the plastic.

According to a preferred form of the invention, the encircling bands take the form of a helically wound single strand of cable which is wound about the tank and extends from top to bottom.

Since the function of the reinforcing means is to assume the hoop stresses, it will be appreciated that the turns of the cable must preferably be closer together at the bottom of the tank where the stress is the greatest than at the top of the tank where the stress is not as great. For any given size of tanks, it will be possible to calculate the number of turns required and the spacing having regard to the size and the strength of the cable used.

The cable may be steel, Monel, aluminum, or any other available metal, or continuous strands of fibrous glass reinforced plastic. The governing requirement is that it possess a relatively high tensile strength and that it be less elastic than the plastic used in the tank so that it may assume the hoop stress when the tank is filled.

My invention also contemplates a method of manufacturing large sizes of plastic storage tanks. Larger tanks can be molded in sections, each section comprising a segment, at the installation site to form a plurality of layers which can then be bonded to each other, the number of layers required being determined by the height of the tank in question. According to the preferred method of the invention as applied to large size plastic storage tanks, the segments forming the bottom layer are assembled and bonded to rest on the foundation prepared for the tank. The segments for the top layer of the side wall are then placed on the bottom and the segments bonded to each other but not to the bottom of the tank. By means of mechanical jacks, the top layer comprising segment thus bonded together with any special segments forming the top or roof of the tank, are lifted above the previously assembled bottom. A spool of steel or other reinforcing cable is then placed in the centre of the bottom of the tank of a dolly which permits the spool to unwind horizontally.

The cable is then wound about the outside of the top layer of segments and led into previously spaced grooves in the joining flanges of the segment. The top end of the cable may be attached to the plastic shell by means of cable clamps which may later be encapsulated with plastic. The spacing of the cable helix is determined by the extent of the hoop stresses at that particular part of the tank.

The cable is wrapped about the plastic shell. As soon as the top layer of segments has been wrapped, the top layer to which the top of the tank has been bonded is raised further by the jacks and the next to the top layer of segments are assembled and bonded together so that they rest on the bottom of the tank. The top layer and top of the tank are then lowered to the second top layer and bonded in place. With the second top layer bonded to the top layer, the combined assembly consisting of top, top layer and second top layer is then jacked up so that the cable can be fed under the segments of the second top layer and the second top layer wrapped with cable.

The same procedure is followed with each layer of segments. When the final layer of segments has been bonded together and to the layer above it is wrapped with cable, lowered to the bottom of the shell and bonded to the bottom.

The bonding resin is the same resin used in the manufacture of the tank segments. The resin may be modified by the addition of colour pigments, light stabilizers, fillers to increase bulk and/or thixotropics additives.

Referring now to the drawing where I have shown one embodiment of a tank 1 constructed in accordance with my invention, tank 1 includes a top layer 2, an intermediate layer 3 and a bottom layer 4. Each of the layers 2, 3 and 4 are made up of four segments 2', 3' and 4', one segment of each layer not being shown. The segments of each layer are provided with flanges 5, and each adjacent segment in a layer is bonded to each adjacent segment at the flanges 5. Each layer is provided with flanges 6 at which adjacent layers are bonded together. Tank 1 is provided with a top 7 and a bottom 8. Top 7 is bonded to the top of top layer 2 while bottom 8 is bonded to the bottom of bottom layer 4 by means of a suitable bonding resin 10. In the embodiment of the invention shown in the drawing, tank 1 is cylindrical in shape and top and bottom 7 and 8 are disc shaped with inwardly extending flanges. Layers 2, 3 and 4 and top and bottom 7 and 8 are made of plastic. A band 9 of high tensile strength material having less elasticity than that of the plastic from which tank 1 is constructed is helically wrapped around the periphery of tank 1. Helical band 9 is positioned in spaced grooves in flanges 5 of the segments that make up the layers. It will be noted that the spacing between adjacent coils of helical band 9 is closer at the bottom of tank 1 than at the top. As previously explained this is because the stress at the bottom of the tank when the tank is full is greater at the bottom than at the top.

The following specific example may serve to give a better understanding of the precise nature of the invention.

A plastic storage tank 15 feet in diameter and 13 feet high was formed of five layers of four segments each. The reinforcing cable used was 1,980 feet of ¼ inch stainless steel and the turns varied from ten inches apart at the top of the tank, substantially evenly to 2½ inches apart at the bottom of the tank.

In addition to light weight which greatly increases the ease, speed and economy of erection, the low cost plastic and relatively small quantity of cable which is readily commercially available commends tanks made in accordance with the invention to many applications.

The tanks are, in most cases, translucent, thus eliminating necessity for expensive level gauges or indicators.

The bonding of the segments and of the layers is a standard practice which does not form part of the invention per se—any of the well known techniques can produce a liquid tight seal.

The invention has been described with reference to preferred embodiments. It is to be understood, however, that the invention is not limited to such embodiments and such embodiments of the invention as come within the scope and purview of the appended claims are to be considered as part of this invention.

What I claim as my invention is:

1. A vertical cylindrical storage tank having side walls and two ends and supported in upstanding position at one end, said side walls being made of plastic material and comprising a plurality of circular layers positioned one on top of the other, each layer comprising a plurality of curved rectangular segments bounded at their edges by flanges, each segment being bonded at its edges to every adjacent segment with said flanges extending outwardly of said tank, certain of said flanges lying parallel to the longitudinal axis of said tank and others of said flanges lying in planes perpendicular to said longitudinal axis of said tank, said certain flanges containing spaced apart transverse grooves therein, and a continuous length of cable helically wound about the outer periphery of said side walls, lying in said grooves and extending from one end of said tank to the other end, said cable being fixed to said tank at at least said two ends and having a lesser elasticity than the elasticity of the plastic side walls, adjacent coils of said cable being spaced apart from one another.

2. A vertical cylindrical storage tank according to claim 1 wherein said coils of said cable are spaced more closely together at the bottom than at the top of said tank.

References Cited in the file of this patent

UNITED STATES PATENTS

| 783,148 | Snow | Feb. 21, 1905 |
|---|---|---|
| 1,138,394 | Mueser | May 4, 1915 |
| 1,434,897 | Howell | Nov. 7, 1922 |
| 1,859,632 | Pheteplace | May 24, 1932 |
| 1,966,244 | Hansen | July 10, 1934 |
| 2,402,253 | Macleod | June 18, 1946 |
| 2,809,762 | Cardona | Oct. 15, 1957 |
| 2,838,261 | Amos et al. | June 10, 1958 |

FOREIGN PATENTS

| 9,143 | Great Britain | 1898 |
|---|---|---|
| 839,018 | France | Dec. 26, 1938 |